Patented May 2, 1933

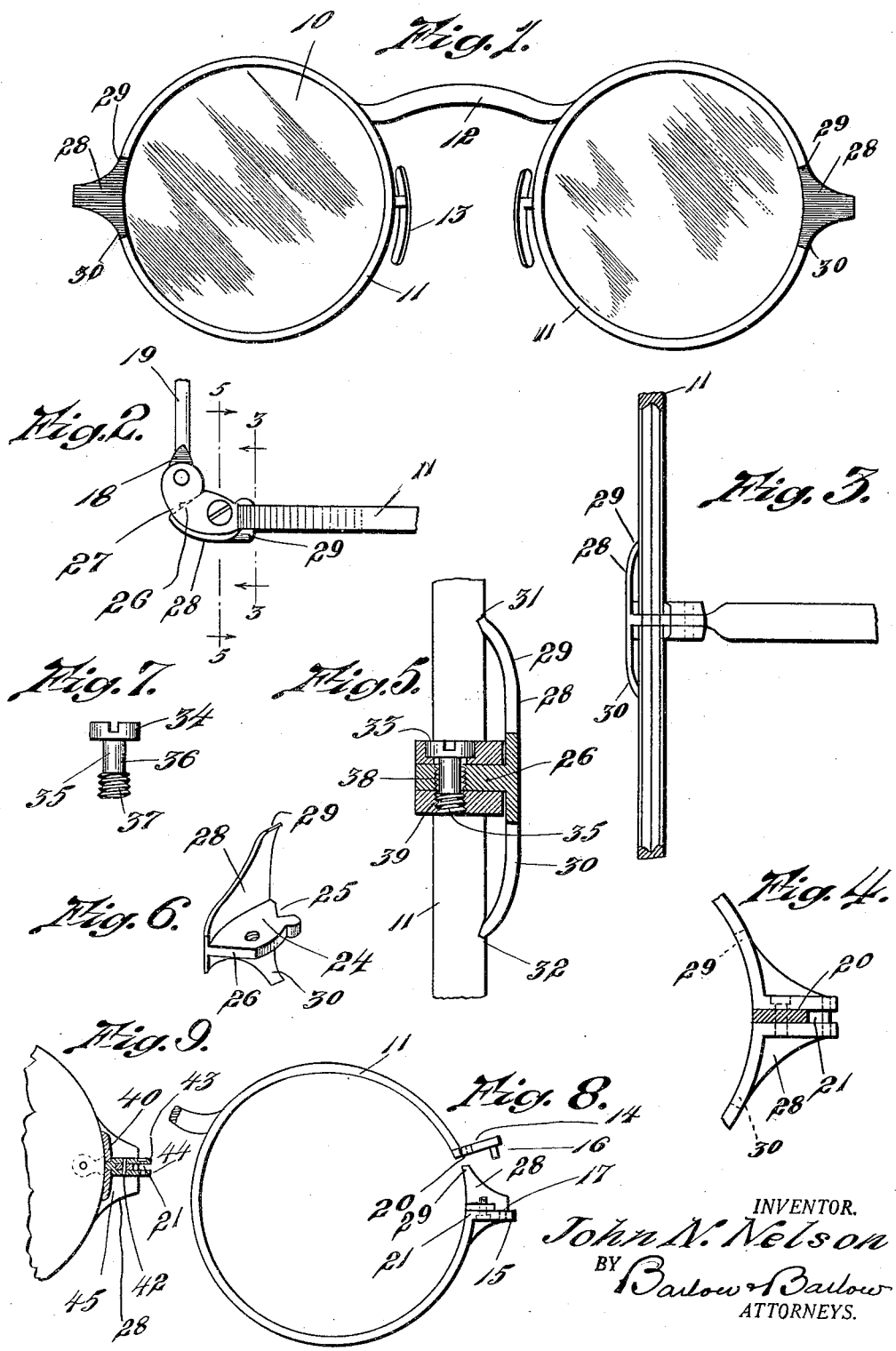

1,906,330

UNITED STATES PATENT OFFICE

JOHN N. NELSON, OF CRANSTON, RHODE ISLAND, ASSIGNOR TO UNIVERSAL OPTICAL CORPORATION, OF PROVIDENCE, RHODE ISLAND, A CORPORATION OF RHODE ISLAND

TEMPLE MOUNTING

Application filed January 21, 1930. Serial No. 422,294.

My present invention relates to the ophthalmic art, and has particular reference to the mounting of temples.

One object of the invention is to simplify the construction and the assembly of temple mountings.

Another object of the invention is to provide a self-locking temple mounting.

A further object is to utilize an end piece spacer as an abutment for the pivoted temple.

An additional object is to provide a shield or cover for the end piece portion of the temple mounting.

With these and other objects and advantageous features in view, the invention consists of novel arrangements of parts more fully disclosed in the detailed description following, in conjunction with the accompanying drawing, and more particularly set forth in the appended claims.

In the drawing:

Fig. 1 is a front view of an ophthalmic frame equipped with the improved temple mounting;

Fig. 2 is a plan view, looking down, of one temple mounting;

Fig. 3 is a section on the line 3—3 of Figure 1;

Fig. 4 is a rear view of one mounting, the temple being removed;

Fig. 5 is an enlarged section through the end pieces and the novel spacer;

Fig. 6 is a perspective view of the novel spacer;

Fig. 7 is a view of the locking screw;

Fig. 8 is a rear view showing the temple pivot pin; and

Fig. 9 is a modified form of spacer suitable for use with rimless ophthalmic mountings.

It has been found desirable, in the manufacture of spectacles and the like, to simplify the construction and the assembly of the temple mountings. Instead of finishing the end piece sections and then milling a groove for the reception of the temple end, I have positioned a novel spacer between these end pieces to space them for receiving the joint end of the temple and to act as an abutment for the temple end. I have also provided the spacer with a novel shield plate which decoratively shields the end pieces and engages the rim to exert a resilient locking action on the end piece holding screw; and the following is a detailed description of a specific construction which embodies the principles of my invention.

Referring to the drawing, the frame 10 has the usual eye-wires 11, bridge 12, and nose guards 13. The eye-wires terminate in the usual end pieces 14, 15, the former having a pivot pin 16 secured therein, see Figure 8, and the latter having an opening 17 for receiving the pivot pin 16.

In forming the end pieces to receive the joint end 18 of the temple 19, the two end pieces have two finished complementary surfaces 20, 21, between which a spacer 24, of the same width as the joint end 18, is positioned. This spacer, as shown in Figure 6, has a V-groove 25 aligning with the V-groove of the eye-wire, and is shaped to correspond to the outline of the end pieces, and has an abutting surface 26 against which the finger 27 of the temple contacts to limit its outward motion; the spacer, in addition, has a shield plate portion 28 which effectively and decoratively covers the two contiguous end pieces. The shield plate preferably terminates in two spaced fingers 29, 30 adapted to engage spaced notches 31, 32 in the eye-wire section, as hereinafter described.

Referring to Figure 5, the end piece 14 is counterbored, as at 33, to receive the head 34 of a holding screw 35 having a smooth reduced shank portion 36 and a screw threaded end 37. The spacer 26 has a threaded opening 38 in alignment with the counterbore 33, and the lower end piece 15 also has a threaded opening 39 in alignment with the other openings. When the holding screw 35 is threaded through the openings 38 and 39, the fingers 29, 30 enter the notches 31, 32, and slightly displace the sides of the opening 38 against the smooth shank portion 36. The assembly is therefore securely locked in place.

The fingers 29, 30 also serve to hold the abutment edge 26 rigid against outward movement of the associated temple, thus eliminating the need for another holding screw or the like to prevent rotation of the spacer. In addition, the shield plate presents a pleasing appearance, the finger portions being shaped to merge with the eyewires and completely mask the outwardly jutting relatively unsightly end pieces, thus imparting uniformity to the contour of the mounting when in position on the face of the wearer.

A modified construction is used for rimless mountings, the lens holder 40 being milled to provide a slot 41 accommodating both the spacer 26 and the temple end 18. The spacer 26 is preferably pinned in place by a pin 42 passing through the end pieces 43, 44, the shield plate 45 being concave to fit snugly against the rim of the lens.

My improved temple mounting therefore facilitates construction and assembly, decoratively covers the outwardly jutting end pieces, presents a sturdy abutment for the temple end, and locks the end piece retaining screw against displacement and loss, since it is difficult to thread the screw 35 through the opening 38, even when the upper end piece is free, as in Figure 8.

While I have described a specific embodiment of my invention, it is obvious that changes in structure and in arrangement may be made, within the spirit and the scope of the invention as defined in the appended claims.

I claim:

1. In a temple mounting, a rim having two end pieces, a spacer mounted between said end pieces and having an abutment face, a temple end pivotally mounted between said end pieces and adapted to engage said abutment face, and an integral shield on said spacer engaging said rim at either side of said end pieces for preventing rotation of the spacer upon engagement of said temple end with said abutment face.

2. In a temple mounting, a rim having two end pieces and recesses at either side thereof, a spacer mounted between said end pieces and having an abutment face, a temple end pivotally mounted between said end pieces and adapted to engage said abutment face, a shield plate on said spacer, and resilient fingers on said shield extending into said recesses for preventing rotation of the spacer upon engagement of said temple end with said abutment face.

3. In a temple mounting, a rim having two end pieces, a spacer mounted between said end pieces and having an abutment face, a countersunk bore in one end piece, threaded holes in the spacer and the other end piece in alignment with the countersunk bore, a holding screw having a smooth shank and a threaded end assembling said end pieces and the spacer therebetween together, said smooth shank being adjacent the hole in the spacer, and a resilient plate secured to said spacer engaging the rim at either side thereof to hide the end pieces and holding screw from view.

4. In a temple mounting, a rim having two end pieces, a spacer mounted between said end pieces, means for securing said spacer against rotation, and a shield plate immovably secured to said spacer and covering said end pieces.

5. In a temple mounting, a rim having two end pieces, a spacer mounted between said end pieces, means for securing said spacer against rotation, and a shield plate integral with said spacer and covering said end pieces.

6. A spacer device for a temple mounting comprising a spacer and an integral shield plate substantially perpendicular to said spacer on one edge thereof and extending on both sides of said spacer beyond the end piece, said shield being flexible to bend in its own general plane.

7. A spacer device for a temple mounting, comprising a spacer and an integral shield plate substantially perpendicular to said spacer on one edge thereof and of an extent to engage the rim beyond and at either side of the end piece to which it is connected, and means to prevent movement of said spacer relative to said end piece.

In testimony whereof I affix my signature.

JOHN N. NELSON.